(12) United States Patent
Kuta et al.

(10) Patent No.: US 12,387,459 B2
(45) Date of Patent: Aug. 12, 2025

(54) SYSTEM AND METHOD FOR IMAGE DE-IDENTIFICATION TO HUMANS WHILE REMAINING RECOGNIZABLE BY MACHINES

(71) Applicant: DE-IDENTIFICATION LTD., Tel Aviv (IL)

(72) Inventors: Eliran Kuta, Tel Aviv (IL); Sella Blondheim, Tel Aviv (IL); Gil Perry, Tel Aviv (IL); Or Gorodissky, Tel Aviv (IL); Matan Ben Yosef, Korazim (IL); Yoav Hacohen, Jerusalem (IL)

(73) Assignee: DE-IDENTIFICATION LTD., Tel Aviv (IL)

( * ) Notice: Subject to any disclaimer, the term of this patent is extended or adjusted under 35 U.S.C. 154(b) by 444 days.

(21) Appl. No.: 17/785,434

(22) PCT Filed: Dec. 15, 2020

(86) PCT No.: PCT/IL2020/051287
§ 371 (c)(1),
(2) Date: Jun. 15, 2022

(87) PCT Pub. No.: WO2021/124321
PCT Pub. Date: Jun. 24, 2021

(65) Prior Publication Data
US 2023/0027309 A1  Jan. 26, 2023

Related U.S. Application Data

(60) Provisional application No. 62/948,370, filed on Dec. 16, 2019.

(51) Int. Cl.
G06K 9/00 (2022.01)
G06V 10/74 (2022.01)
(Continued)

(52) U.S. Cl.
CPC .......... *G06V 10/761* (2022.01); *G06V 10/774* (2022.01); *G06V 10/82* (2022.01); *G06V 40/16* (2022.01)

(58) Field of Classification Search
CPC .... G06V 40/172; G06V 10/82; G06V 40/173; G06V 40/174; G06V 40/168
See application file for complete search history.

(56) References Cited

U.S. PATENT DOCUMENTS 10,163,042 B2 * 12/2018 Cheng ................. G06V 20/30
11,526,626 B2 * 12/2022 Kuta .................... G06T 9/002
(Continued)

FOREIGN PATENT DOCUMENTS

WO   WO 2018/225061   12/2018

OTHER PUBLICATIONS

Search Report of International Application No. PCT/il2020/051287 mailed on Mar. 25, 2021.
(Continued)

*Primary Examiner* — Hadi Akhavannik
(74) *Attorney, Agent, or Firm* — PEARL COHEN ZEDEK LATZER BARATZ LLP

(57) ABSTRACT

A system and method for de-identification of an image may include receiving an input image of a human face; iteratively modifying the input image to produce an output image of the human face until: (a) a threshold indicating how unlikely a human is to associate the input image with the output image is reached, and (b) a threshold indicating an ability of a computerized unit to associate the input image with the output image is reached; and providing the output image.

18 Claims, 5 Drawing Sheets

(51) Int. Cl.
*G06V 10/774* (2022.01)
*G06V 10/82* (2022.01)
*G06V 40/16* (2022.01)

(56) References Cited

U.S. PATENT DOCUMENTS

| | | | |
|---|---|---|---|
| 11,893,828 B2* | 2/2024 | Perry | G06V 10/761 |
| 2012/0072121 A1* | 3/2012 | Mollicone | A61B 5/1176 |
| | | | 702/19 |
| 2015/0324633 A1* | 11/2015 | Whitehill | G06V 40/174 |
| | | | 382/248 |
| 2019/0332850 A1 | 10/2019 | Sharma et al. | |
| 2020/0118029 A1* | 4/2020 | DeBraal | G06F 40/56 |

OTHER PUBLICATIONS

Newton EM, Sweeney L, Malin B. Preserving privacy by de-identifying face images. IEEE transactions on Knowledge and Data Engineering. Jan. 10, 2005;17(2):232-43. Newton et al, Jan. 10, 2005.

* cited by examiner

SYSTEM AND METHOD FOR IMAGE DE-IDENTIFICATION TO HUMANS WHILE REMAINING RECOGNIZABLE BY MACHINES

CROSS-REFERENCE TO RELATED APPLICATIONS

This application is a National Phase Applications of PCT International Application No. PCT/IL2020/051287, International Filing Date Dec. 15, 2020, published as WO 2021/124321 and entitled System and Method for Image De-Identification to Humans While Remaining Recognizable by Machines claiming the benefit of U.S. Provisional Patent Application(s) No(s). 62/948,370, filed Dec. 16, 2019, which is hereby incorporated by reference.

FIELD OF THE INVENTION

The present invention relates to facial de-identification. More particularly, the present invention relates to generative models using facial recognition for style transfer on images.

BACKGROUND OF THE INVENTION

The task of facial recognition has gained immense progress in recent years, and artificial facial recognition system suppressed human performance by a big margin. These systems can recognize an identity (e.g., recognize a face) out of a large set of identities, using facial visual media only.

Recent studies show that humans are influenced by the style and context of the image, like the hair, glasses, clothes etc. of the subject under need of recognition together with colors and textures of the image. Modern artificial facial recognition systems are planned to overcome these style influences using various generative methods. The gap between human and artificial recognition has led to the development of de-identification techniques to change the recognizable part of an image (or other media) while maintaining the style of the original image (e.g., gender, age, ethnicity, expression etc.).

De-identified images (or other media) can be used for various applications such as testing and improving fraud detection procedures to sensitive systems relying on human and artificial facial recognition. In artificial de-identification the goal is to process the identity unrecognizable for artificial facial recognition systems, and in human de-identification the goal is to process the identity unrecognizable for humans. The problem of human de-identification can be formulated as a style transfer problem (as humans tend to fixate on the style in media), for instance where the style is the appearance of the image, and the structure of a face is the identity in the image.

SUMMARY OF THE INVENTION

In some embodiments, a method of image de-identification may include receiving an input image of a human face; iteratively modifying the input image to produce an output image of the human face until: (a) a threshold indicating how unlikely a human is to associate the input image with the output image is reached, and (b) a threshold indicating an ability of a computerized unit to associate the input image with the output image is reached; and providing the output image.

Optimizing the output image may include calculating, in at least some of the iterations: a first score value produced by a first function reflecting the likelihood that a human would associate the face in the input image with the face in the output image; a second score value produced by a second function reflecting the ability of a computerized unit to associate the face in the input image with the face in the output image; and selecting to provide the output image if a function of the first and second values reaches a threshold.

An embodiment may provide the output image if a sequence of values produced by a function of the first and second values converges to a value. An embodiment may provide the output image upon determining a threshold number of iterations was reached.

A method of generating a neural network model may include: training neural network including a model by, for each input image in a set of input images of faces: generating, using the model, an output image of the face; calculating, by a first function, a dis-similarity score reflecting the likelihood that a human would associate the face in the input image with the face in the output image; calculating, by a second function, an identity-similarity score reflecting an ability of a computerized unit to associate the face in the input image with the face in the output image; and modifying parameters of the model such that a sequence of values produced by a function of the first and second scores reaches a threshold.

Modifying parameters of the model may be such that a sequence of values produced by a function of the first and second scores converges to a value. An embodiment may terminate the training when determining at least one of: one or more scores produced by the first function reached a first threshold, one or more scores produced by the second function reached a first threshold, and a threshold number of processed images was reached. Modifying parameters of the model may be based on an aggregated score of a set of images.

An embodiment may terminate the training when determining at least one of: scores produced by the first function and scores produced by the second function has reached one of: a minimal value and a maximal value.

An embodiment may terminate the training when determining a function of at one of: scores produced by the first function and scores produced by the second function has reached one of: a minimal value and a maximal value. Other aspects and/or advantages of the present invention are described herein.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
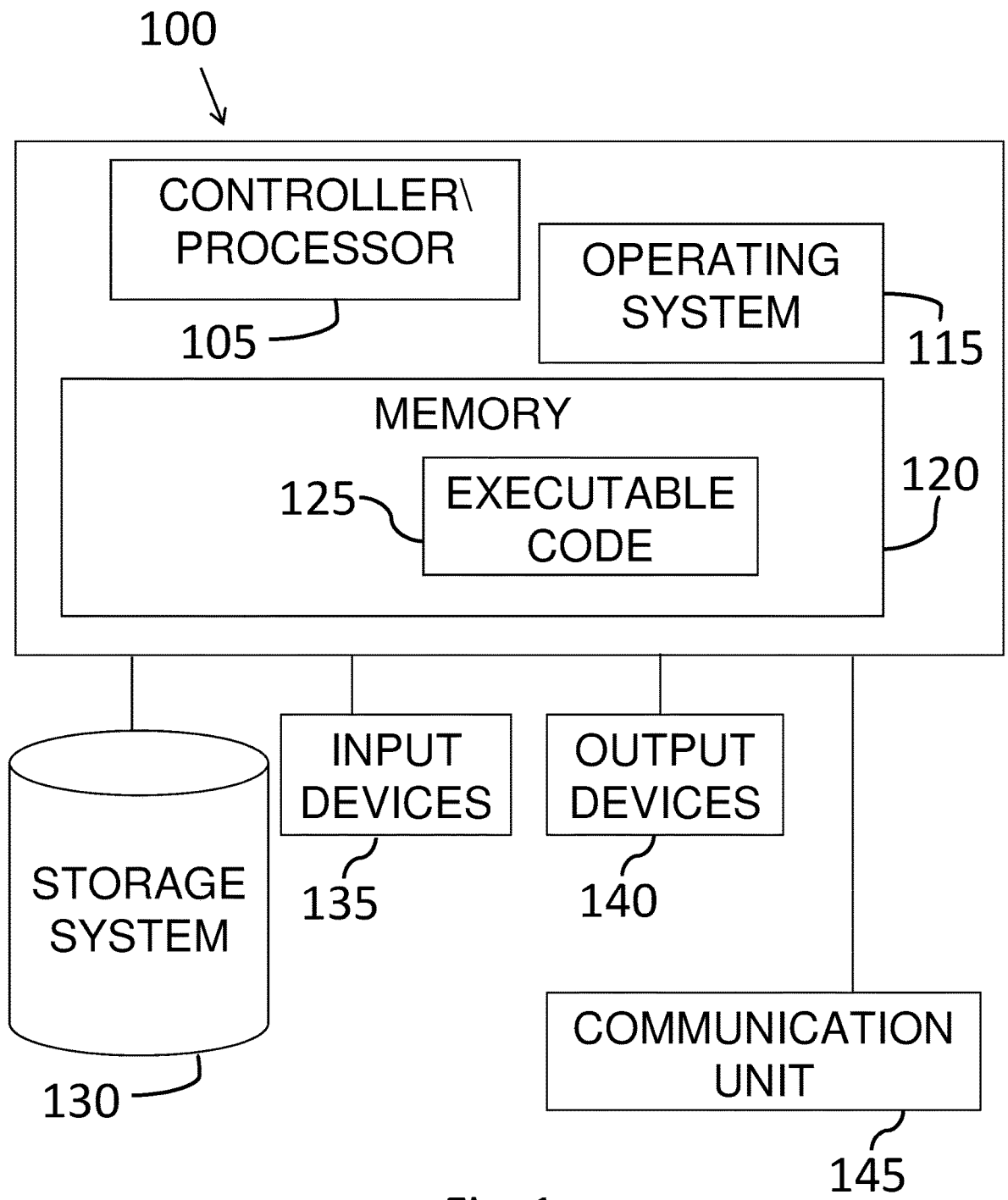
FIG. 1 shows a block diagram of an exemplary computing device, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, which is a schematic block diagram of an example computing device, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet. Controller 105 may be configured to execute program code to perform operations described herein. The system described herein may include one or more computing device 100, for example, to act as the various devices or the components shown in FIG. 2. For example, system 200 may be, or may include computing device 100 or components thereof.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by processor or controller 105 possibly under control of operating system 115. For example, executable code 125 may be a software application that performs methods as further described herein. Although, for the sake of clarity, a single item of executable code 125 is shown in FIG. 1, a system according to some embodiments of the invention may include a plurality of executable code segments similar to executable code 125 that may be stored into memory 120 and cause processor 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a processor such as processor 105. Such a non-transitory computer readable medium may be, for example, a memory, a disk drive, or a USB flash memory, encoding, including or storing instructions, e.g., computer-executable instructions, which, when executed by a processor or controller, carry out methods disclosed herein. The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to some embodiments of the invention may include components such as, but not limited to, a plurality of central processing units (CPU) or any other suitable multi-purpose or specific processors or controllers (e.g., processors similar to processor 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more facility computing device 100 and one or more remote server computers in active communication with one or more facility computing device 100 such as computing device 100, and in active communication with one or more portable or mobile devices such as smartphones, tablets and the like.

Figure 2:
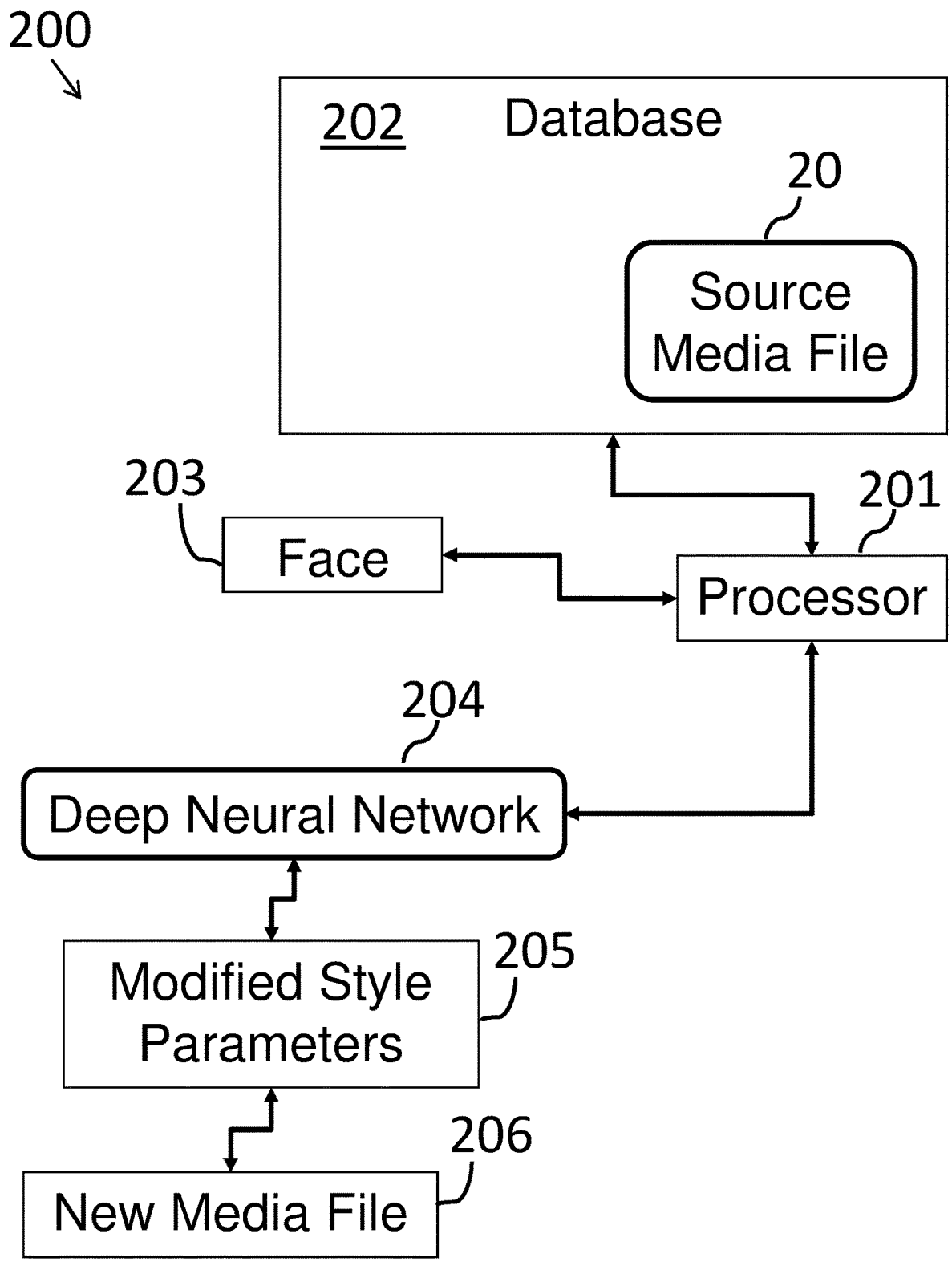
FIG. 2 shows a block diagram of a system for de-identification in media, according to some embodiments of the invention.

Reference is now made to FIG. 2, which shows a block diagram of a system 200 for de-identification in media, according to some embodiments.

The system 200 may include a processor 201 (e.g., such as controller or processor 105 shown in FIG. 1), processor 201 may be configured to receive one or more source media files 20, and generate a new, de-identified media file 206 from the one or more source media files by modifying style parameters while maintaining, in the de-identified media file 206, information enabling computerized face recognition, as further described hereinafter.

In some embodiments, the system 200 may include a database 202 that may be stored or maintained, for example, by storage system 130 of FIG. 1. Database 202 may be coupled to processor 201, and may comprise at least one media file 20 (e.g., an image file, a video file, and the like).

The processor 201 may execute a program (e.g., such as executable code 125 shown in FIG. 1) to recognize or identify a face 203 from the at least one media file 20 using facial recognition. In some embodiments, the processor 201 may feed the at least one media file 20 to a deep learning neural network 204. The deep learning neural network 204 may be configured to maintain facial recognition of the determined face 203 while modifying style parameters 205 of the received at least one media file 20.

According to some embodiments, modifying the style parameters 205 of the received media at least one file 20 may be carried out with application of a loss function T to maximize the style dis-similarity while maintaining the identity with multiscale perceptual features of facial recognition using formula A:

$$\ell = \lambda_0 \|\Theta_0(X_{src}) - \Theta_0(X_D)\| - \lambda_1 \|\Theta_1(X_{src}) - \Theta_1(X_D)\| \ldots \\ -\lambda_k \|\Theta_k(X_{src}) - \Theta_k(X_D)\|$$ Formula A where 'k' is a scale index, 'λ' is a weight, 'Θ' is a parameter of the neural network, '$X_{SRC}$' is the received media file, and '$X_D$' is the new media file.

In some embodiments, the processor 201 may generate a new media file 206 from the received at least one media file 20 based on the modified style parameters 205. For example, the generated new media file 206 may be de-identified such that the new media is recognizable by a human observer but not by a machine performing facial recognition.

In some embodiments, the style parameters may be measured using high level features $\Theta_k$ of a facial recognition model, while the identity (or structure) may be kept similar using the low level features $\Theta_0$ (also called the face template). Thus, the deep neural network may modify the received at least one media file 20 by manipulating style features while maintaining the structure features that are recognizable to human observers.

In some embodiments, the identity (or structure) parameters may be determined in parallel to the style parameters 205 for generation of the new media file 206.

In some embodiments, the deep learning neural network 204 may be trained on a set of media files 20 with predefined style parameters 205. According to some embodiments, style parameters 205 may be modified at different layers of the deep learning neural network 204 (while maintaining identity and/or structure recognition) until the new media file comprises a newly generated media (e.g., an image) that may not be recognizable by the facial recognition algorithms. Such generated media may be considered as de-identified media since a human observer may still recognize the identity in the media due to the condition forced on the deep neural network 204 for maintaining the structure.

In some embodiments, the processor 201 may perform a generative model of facial recognition using the deep neural network 204 to produce media (e.g., images) that are subject to style dis-similarity while maintaining facial recognition similarity. The deep neural network 204 may be trained with the condition of style dis-similarity while maintaining facial recognition similarity. In some embodiments, the deep neural network 204 may be pre-trained and receive the condition of style dis-similarity while maintaining facial recognition similarity for new results.

Figure 3:
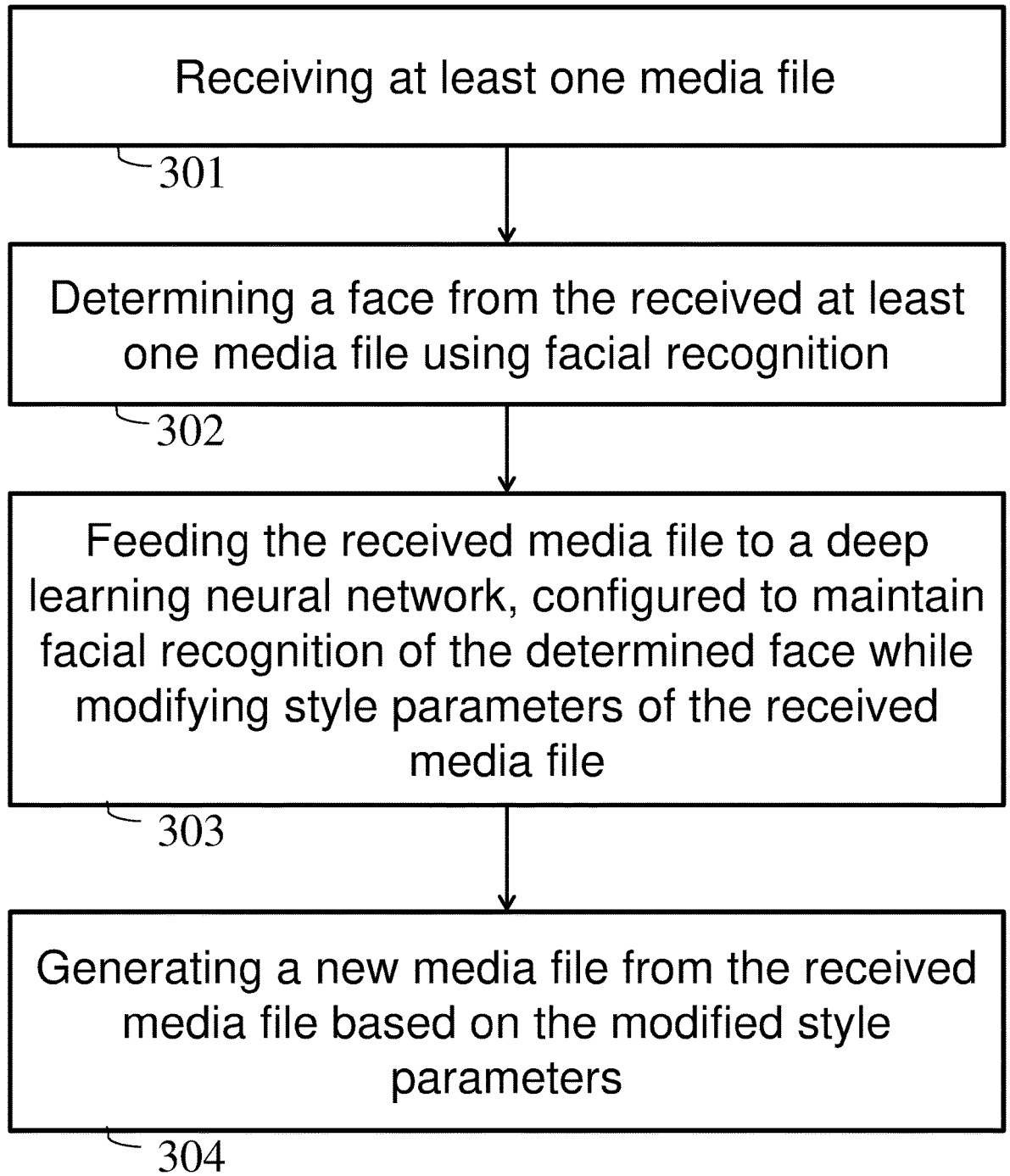
FIG. 3 shows a flowchart of a method of image de-identification, according to some embodiments of the invention.

Reference is now made to FIG. 3, which shows a flowchart of a method of image de-identification, according to some embodiments. In Step 301, at least one media file may be received.

In Step 302, a face may be determined from the received media file using facial recognition. In Step 303, the received at least one media file may be fed to a deep learning neural network, where the deep learning neural network may be configured to maintain facial recognition of the determined face while modifying style parameters of the received media file. In Step 304, a new media file may be generated from the received media file based on the modified style parameters.

In some embodiments, modifying the style parameters of the received media file may be carried out with application of a loss function '1' to maximize the style dis-similarity while maintaining the identity with multiscale perceptual features of facial recognition, e.g., using formula A described above.

In some embodiments, a method of image de-identification may include: receiving a media file; determining a face from the received media file using facial recognition; feeding the received media file to a deep learning neural network (NN), where the NN is configured to maintain facial recognition of the determined face while modifying style parameters of the received media file; and generating a new media file from the received media file based on the modified style parameters. In some embodiments, modifying the style parameters of the received media file is carried out with, or by, application of a loss function '1' to maximize the style dis-similarity while maintaining the identity with multiscale perceptual features of facial recognition, for example, the loss function may be as shown by formula A above. In some embodiments, style parameters are measured using high-level features $\Theta_k$, and the identity is kept similar using the low-level features $\Theta_0$.

In some embodiments, a deep learning NN is trained on a set of media files with predefined style parameters. In some embodiments, a system for de-identification may include a database comprising at least one media file and a processor coupled to the database, wherein the processor is configured to: determine a face from the at least one media file using facial recognition; feed the at least one media file to a deep learning NN, where the deep learning NN is configured to maintain facial recognition of the determined face while modifying style parameters of the received media file; and generate a new media file from the received media file based on the modified style parameters.

For example, the processor may modify the style parameters of the received media file using a loss function, e.g., a loss function as shown by formula A and described herein. In some embodiments the processor may measure style parameters using high-level features $\Theta_k$, and may maintain or keep an identity in an image using the low-level features $\Theta_0$.

Figure 4:
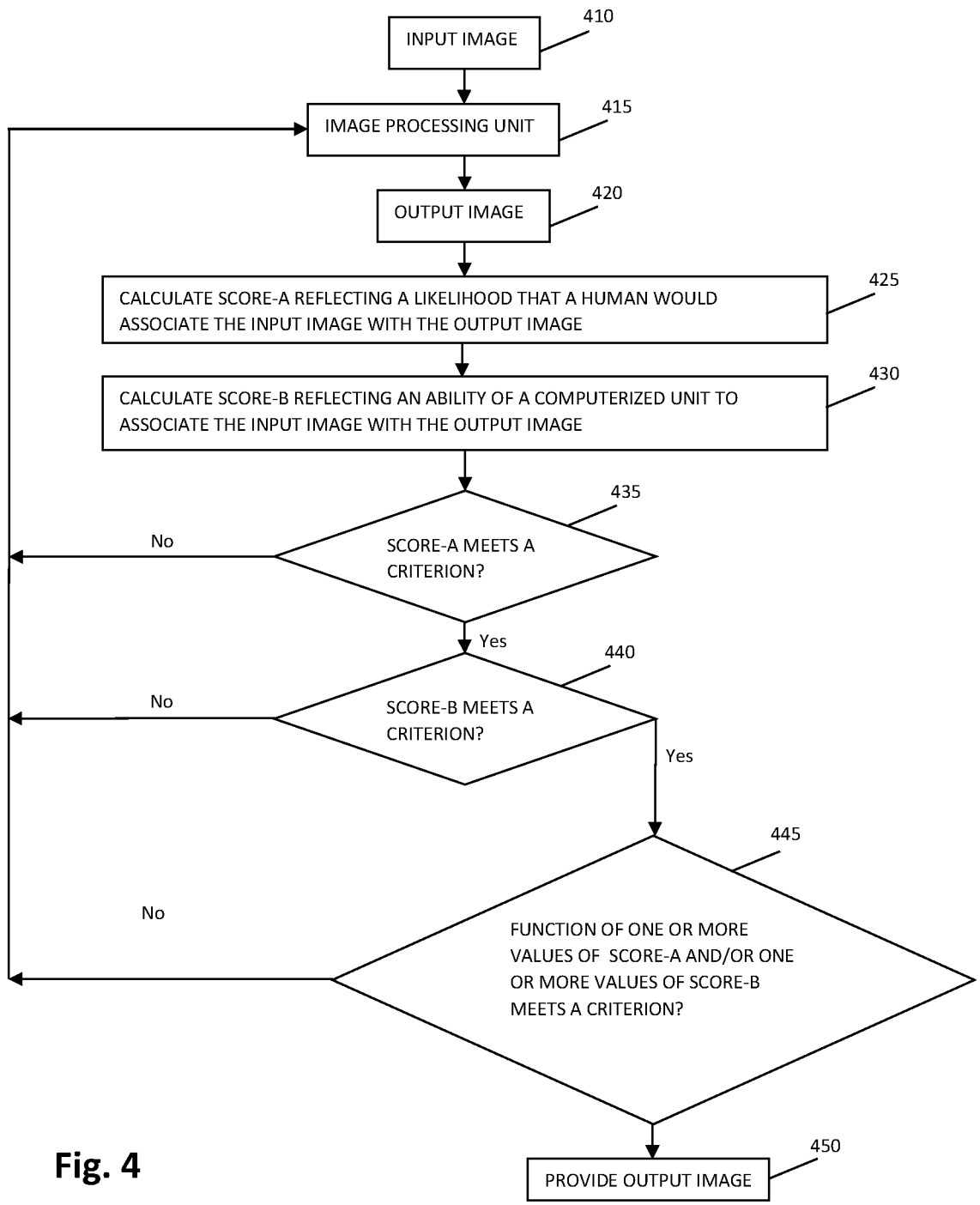
FIG. 4 shows a system and flow of a method of image de-identification, according to some embodiments of the invention.

Reference is made to FIG. 4 which shows a system and flow according to some embodiments of the invention. For example, the flow shown in FIG. 4 may be executed by controller 105 or by processor 201 and image processing unit 415 may be, or may include a segment of executable code 125 and controller 105. As shown, an input image 410 may be provided to an image processing unit 415. In some embodiments, image processing unit 415 may be an NN or it may include a model generated by training an NN.

For example, input image 410 may be an image or photo of one or more individuals (people, humans or persons) where the people or persons shown in (or captured by) input image 410 may be readily identified by a human as well as possibly by a computerized face recognition unit (CFRU). For example, input image 410 may be a photo capturing the face of John and a family member or a person who knows John may readily identify John in input image 410. For the sake of clarity and simplicity, a face shown in, or captured by input image 410 may be referred to herein as an input face 410.

A CFRU as referred to herein may be any computerized face recognition module or component that may include hardware, software firmware or any combination thereof. For example, a CFRU may be an application executed by a processor (e.g., processor 201 of FIG. 2) that analyzes an input image and identifies one or more humans shown in the input image. For example, identifying a face (or a person) by a CFRU may be, or may include, determining that the faces in an input image and in a reference image are of the same person. For example, provided with a reference image of John (or John's face), a CFRU may determine and indicate whether or not the face shown in an input image is John's face.

As further shown, image processing unit 415 may produce an output image 420 that may include a face. Producing output image 420 may be done by changing pixels (or pixels' values) in input image 410. For the sake of clarity and simplicity, a face shown in, or captured by output image 420 may be referred to herein as an output face 420. For example, image processing unit 415 may produce output image 420 such that a human who can identify or recognize the input face in image 410 cannot identify or recognize the output face in output image 420 while a CFRU can identify or recognize the output face in output image 420. Otherwise described, image processing unit 415 may generate output image 420 such that a human would not determine (think or believe) that the faces shown in input image 410 and output image 420 are of the same person while a CFRU would determine that the input and output faces in input image 410 and output image 420 respectively are indeed of the same person.

As shown by block 425, some embodiments may calculate a score-A that reflects, indicates or quantifies the likelihood that a human would associate the input face in input image 410 with the output face in output image 420. Any method, system or technique may be used by embodiments of the invention in order to calculate score-A. For example, e.g., during supervised training, input from a user indicating how confident the user is that the input face (in input image 410) and the output face (in output image 420) are of the same person may be provided to image processing unit 415, in other embodiments or scenario, input from a user may indicate how certain the user is that the input and output faces 410 and 420 are not of the same person.

In yet other embodiments, calculating score-A may be done by a computerized unit adapted to mimic a human. For example, an NN may be trained to closely mimic (or assume or possess) the ability of humans to identify or recognize faces in images and/or to closely mimic the ability of humans to determine whether or not two faces shown in two different images are of the same person. Such NN (or a model generated by training the NN) may be used in order to calculate score-A. For example, provided with input and output faces 410 and 420, a computerized unit as described may associate (e.g., with output face 420) a score-A of "9.8" if it determines a human is highly likely to associate the two faces with the same person, a score-A of "6.2" if it determines a human is somewhat likely to associate the two faces, and a score-A of "0.7" upon determining that a human would not recognize/associate output face 420 as/with the input face 410.

As shown by block 430, some embodiments may calculate a score-B that reflects, indicates or quantifies an ability of a CFRU to associate the input face in input image 410 with the output face in output image 420. For example, one or more commercial or other CFRUs may be provided with input face 410 and output face 420 as input and may provide an output that indicates whether or not the input faces are of the same person. In some embodiments, the CFRUs may output an association, identification or recognition confidence level value that indicates how confident the CFRU is of its determination and the confidence level value may be used as, or used for calculating score-B. In some embodiments, results from a set of more than one CFRUs may be aggregated (e.g., sum, product, average or other combination) and used in order to set a value for score-B. For example, a number of different types of CFRUs may be provided with output image 420 and score-B may be calculated based on how many of the CFRUs determined that the face of the person shown in input image 410 is also represented (or can be identified or recognized) in output image 420.

As shown by block 435, some embodiments may check whether or not score-A meets a criterion, e.g., reached a threshold value or otherwise meets a criterion. As further shown, if score-A does not meet a criterion then an embodiment may repeat the steps of producing an output image 420 based on input image 410 or based on output image 420 from the previous iteration and calculating score-A as described. In some embodiments, rather than using the original input image 410, that is, the image used in a first iteration, output image 420 may be used as input to image processing unit 415 in a second or subsequent iteration such that an embodiment may keep changing or modifying (or iteratively modify) an image until score-A meets a criterion. For example, an embodiment may generate a modified image by modifying an input image, check if score-A calculated for the modified image meets a criterion and, if the criterion is not met, the embodiment may modify the modified image to create a second modified image and so on. Accordingly, in some embodiments, a process of generating an output image may be an iterative process in which the output of a first iteration is used as input to a second, subsequent iteration and the iterative process may be carried out until the value of score-A meets a criterion or reaches a threshold value. For example, remaining with the numeric example above, if the goal is that a human would not be able to associate the input face (in input image 410) with the output face in output image 420, that is, a human would determine the two faces are not of the same person, then iterations as described may be repeated until score-A is less than "0.7".

As shown by block 440, some embodiments may check whether or not score-B meets a criterion, e.g., reached a threshold value. For example, assuming a value of score-B greater than "6.5" indicates that a CFRU is able to determine, identify or recognize that the input and output faces are of the same person then any value of score-B greater than "6.5" may be considered as meeting a criterion of being greater than "6.5" thus ensuring that a CFRU is able to recognize the output face. Accordingly, the combination of the criteria checked as shown by blocks 435 and 440 may ensure that a human cannot identify the face in the output image 420 (or cannot associate the input face with the output face) while a CFRU can identify the output face (or determine the input and output faces are of the same person).

As shown by block 445, some embodiments may check whether or not a function of one or more values of score-A and/or one or more values of score-B meets a criterion. For example, checking against a criteria as shown in block 445 may include determining whether a sequence of values of score-A is decreasing (meaning de-identification of a face is improving), or determining a sequence of values of score-A has reached a minimum value (meaning de-identification of a face is not improving from one iteration to the next) and so on.

De-identification as referred to herein may be or may include obscuring or concealing a face in an image such that the identity of the person whose face is shown in the de-identified image cannot be determined by a human. Accordingly, optimizing a de-identification of a person's face in an image may include making it as hard as possible (or preferably impossible) for a human to identify or recognize a face in a de-identified image. For example, output image 420 may be produced by de-identifying the identity of a person shown in input image 410 such that a human who can recognize the person (or face) shown in input image 410 cannot identify the person or face shown in output image 420. Otherwise described, de-identifying input image 410 may produce output image 420 such that a human cannot associate input image 410 with output image 420, that is, determine that these two images are of the same person.

Checking against a criteria as shown in block 445 may include determining whether a sequence of values of score-B is approaching a threshold value which, if breached, means a CFRU may be unable to identify the output face, and an embodiment may select to avoid performing additional iterations if the threshold value is about to be breached. In some embodiments, a function of a combination of values of score-A and score-B may be used as shown by block 445, for example, the sum of values of score-A and score-B may be used or a condition or criterion involving, or related to values of score-A and score-B, e.g., both reached a minimum value may be used.

As shown by the arrow connecting blocks 445 and 410, if a criterion was not met then an embodiment may perform another, subsequent or additional iteration, that is, repeat the process starting with modifying an input image and calculating and evaluating scores as described. In some embodiments, each iteration may use (or reuse), as input, the same, original or initial input image 410. For example, the same clear image clearly showing a person's face may be used in each iteration and each iteration may apply different changes or modifications to the input image as described. In other embodiments, an output image 420 of a first iteration may be used as input to a second, subsequent iteration such the output image keeps evolving and changing until conditions are met as described.

As shown by block 450, if the criterion in block 445 is met then an embodiment may provide output image 420, which, as described, may be an image in which a human cannot identify the input face in input image 410 but in which a CFRU may identify the input face (and thus the person) in output image 420, e.g., determine that input face 410 and output face 420 are of the same person. As shown by block 450, an output image may be provided. For example, providing a de-identified (output) image may include storing the output image in a database of an organization.

Figure 5:
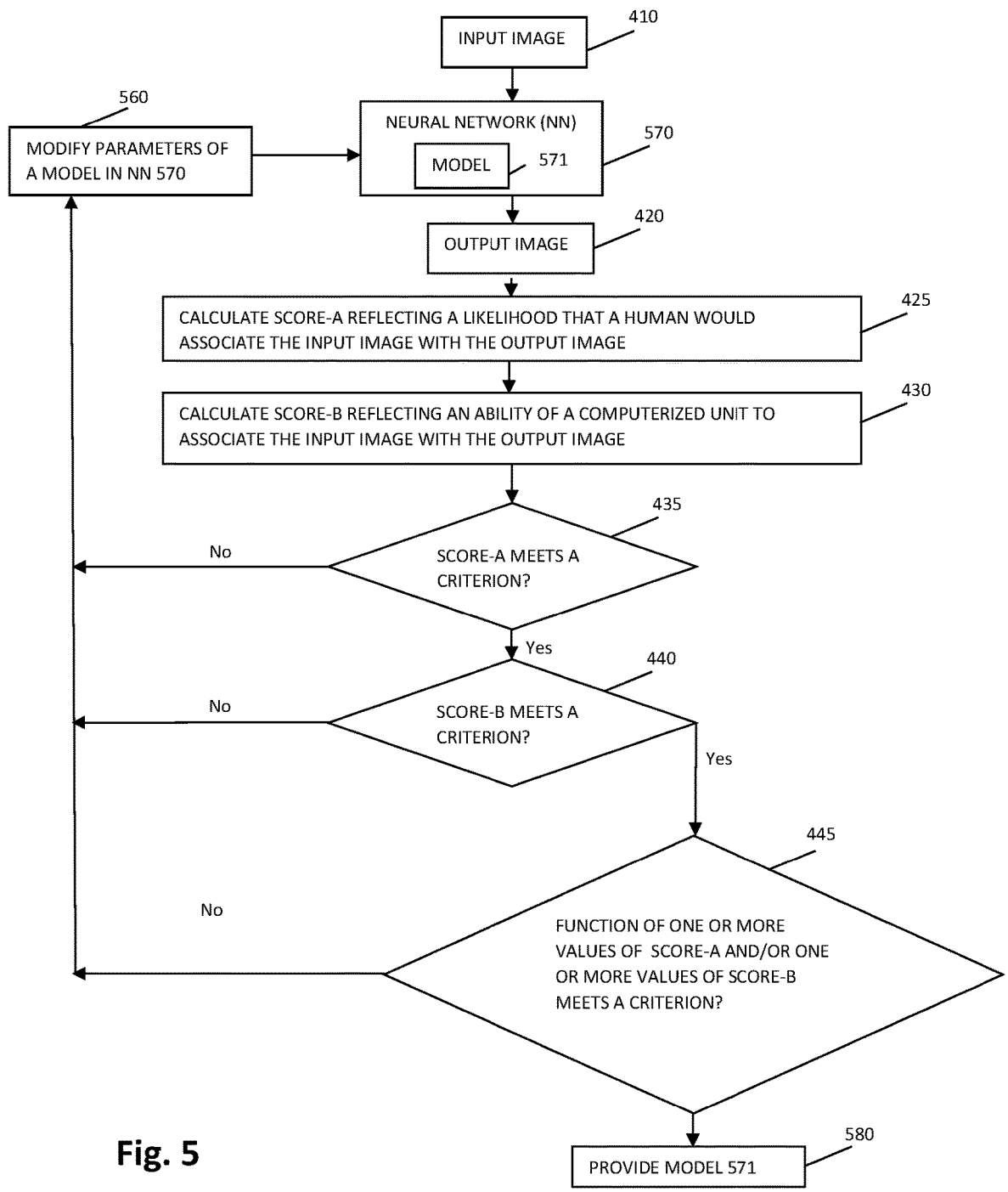
FIG. 5 shows a system and flow of a flowchart of a method of image de-identification, according to some embodiments of the invention.

Reference is made to FIG. 5 which shows system and flow according to some embodiments of the invention. For example, the flow shown in FIG. 5 may be executed by controller 105 or by processor 201 and NN 570 may be, or may include a segment of executable code 125 and controller 105. Blocks with numerals 410, 420, 425, 430, 435, 440 and 445 in FIG. 5 are similar to those shown in FIG. 4 and are described herein with reference to FIG. 4. As shown by block 570, instead of an image processing unit 415 shown in FIG. 4, an NN 570 including a model 571 may be used and the flow shown in FIG. 5 may be used for training the NN 570 and/or generating, training or updating model 571. As shown by block 560, parameters of NN 570 may be modified in each iteration and, as shown by block 580, the flow may end with providing an NN model, e.g., providing model 571 (or a copy or instance thereof). In some embodiments, model 571 in NN 570 may be modified such that, or as long as, a function (e.g., a function of score-A and/or score-B) as shown in block 445 converges towards a value, reaches a minimum or a maximum value or otherwise meets a criterion.

In some embodiments, a method of image de-identification may include receiving an input image of a human face; iteratively modifying the input image to produce an output image of the human face until: a threshold value indicating how unlikely a human is to associate the input image with the output image is reached, and a threshold value indicating an ability of a computerized unit to associate the input image with the output image is reached. A method may further include providing the output image.

For example, as described with reference to FIG. 4, an embodiment may iteratively modify input image 410 (or modify output image 420 from a previous iteration in a subsequent or current iteration), calculate score-A that reflects how likely a human is to associate the input image (or input face in an original or initial input image 410) with the output image or face, calculate a score-B reflecting or quantifying an ability of a computerized unit to associate an input image with an output image, and, if a threshold value related to score-A and/or score-B is reached, e.g., as described with reference to blocks 435 and 440 in FIG. 4, the method may include providing the output image as shown by block 450 and described herein. It will be understood that score-A may reflect the likelihood that a human would recognize or identify a face in an image, or score-A may be used to reflect, indicate or quantify how unlikely a human is to recognize or identify a face in an image. For example, if a score of "0.82" reflects how likely a human is to recognize a face as described then a score of "0.12" (1−0.82) may reflect how unlikely a human is to recognize the face. Similarly, score-B may be used to reflect or indicate either the ability or inability of a CFRU to recognize a face.

In some embodiments, optimizing a de-identification of a person's face in an image may include calculating, in at least some of the iterations: a first value (e.g., a value of score-A) produced by a first function reflecting the likelihood that a human would associate the face in the input image with the face in the output image; a second value (e.g., a value of score-B) produced by a second function reflecting the ability of a computerized unit to associate the face in the input image with the face in the output image; and selecting to provide the output image if a function of the first and second values reaches a threshold value. For example, as shown in block 445 in FIG. 4, a function of one or more values of score-A and/or one or more values of score-B calculated in a respective one or more iterations as described may be calculated and based on a result or behavior of the function over a set of values, and embodiment may select to terminate a flow and provide the output image produced in the current iteration. For example, a function as shown in block 445 and described herein may be a loss function designed to maximize a style dis-similarity while maintaining an identity with multiscale perceptual features of facial recognition. Otherwise described, the function (e.g., a loss function as shown by formula A) may be designed to alter or change aspects of an image which are perceivable by a human while maintaining, in the image, aspects used by CFRUs. For example, using a loss function, model 571 may be configured to modify, in an image, features (e.g., facial features) that affect the way a human perceives or recognizes elements or people in an image while avoiding altering features or aspects which are used by CFRUs in order to identify or recognize a face.

Some embodiments may select to provide an output image if a sequence of values produced by a function of first and second values converges to a value. For example and as shown in block 445, if a function of values of score-A and/or values of score-B calculated in a one or more iterations as described converges to a value, then an embodiment may determine the further or additional iterations would not improve de-identification, that is, additional iterations would not further conceal the identity of a person's face in an image and, accordingly, the embodiment may terminate the flow shown in FIG. 4 by providing the output image.

Some embodiments may select to provide an output image upon determining a threshold number of iterations was reached. For example, an embodiment may increment a counter in each iteration shown in FIG. 4 and if the counter reaches a threshold value then an embodiment may provide the output image even if conditions checked as described (e.g., with reference to blocks 435, 440 and 445) are not met. For example, an embodiment may provide the output image if ninety ("90") iterations of modifying and remodifying an input image have been performed.

Some embodiments may generate an NN model by training an NN. For example, model 571 may be generated, updated or trained. Training an NN may start with obtaining or setting up an NN including a model (571) and obtaining a set of input images (e.g., of a respective set of people). The training may further include, for each input image in the set: generating, using the model, an output image of the face; calculating, by a first function, a style dis-similarity score reflecting the likelihood that a human would associate the face in the input image with the face in the output image; calculating, by a second function, an identity-similarity score reflecting an ability of a computerized unit to associate the face in the input image with the face in the output image; modifying parameters of the model such that a sequence of values produced by a function of the first and second scores reaches a threshold value.

For example, a style dis-similarity score may be score-A described herein and an identity-similarity may be score-B described herein. Generally, and as described and referred to herein, style parameters are features, aspects or other aspects of or in an image based on which humans identify a face while identity-similarity refers to features, aspects or other aspects of or in an image based on which a CFRU identifies a face in an image.

For example, to generate, update, configure or train model 571, an embodiment may iteratively retrieve, e.g., from a database of face images, an image and use the image as input image 410, modify the by NN 570 according to model 571 to produce output image 420, perform the steps shown by blocks 425, 430, 435, 440 and 445 as described herein, and, observing the function as shown in block 445, modify parameters of model 571 as shown by block 560. Such model optimization flow may be carried out, for each image in the database, until a condition or criterion applied to the function in block 445 is met and the flow may then be executed again using another image obtained from the database.

In some embodiments, the flow shown in FIG. 5 may be continued or executed until a sequence of values produced by a function of the first and second scores converges to a value. For example, if it is determined in block 445 that, in a sequence of iterations, a sum, product or any other function of a sequence values of the dis-similarity and identity-similarity scores (e.g., values of score-A and score-B) does not change by more than a predefined rate, or has reached a minimal or maximal value, then an embodiment may determine that negligible or no optimization will be achieved by performing additional iterations and the embodiment may provide the model as shown by block 580.

Some embodiments may terminate a training of NN 570 when determining at least one of: one or more scores produced by the first function reached a first threshold value, one or more scores produced by the second function reached a first threshold value, and a threshold number of processed images was reached. For example, if in block 435 it is determined that score-A (the dis-similarity score) reached a predefined value indicating that a human would not be able to identify a face in output image 420 as the face in input image 410 then an embodiment may decide that model 571 is ready to be delivered. Similarly, an embodiment may determine model 571 is ready for shipment if an identity-similarity calculated for a set of images reached a predefined value. In some embodiments, a threshold number of iterations may be set such that even if it is observed that model 571 is improved from one iteration to the next, the optimization process is terminated and not carried out indefinitely.

Some embodiments model 571 may be modified, e.g., as shown by block 560, based on an aggregated score of a set of images. For example, scores' values calculated as shown by blocks 435 and 440 in a number of iterations may be stored and a function may be applied to a set of stored scores. For example, a set of score values may be combined, summed up, aggregated or used as input to any function, and modifying parameters of model 571 as shown by block 560 may be based on a function of a set of scores' values. Such aggregated scores approach may enable embodiments of the invention to efficiently train model 571 using thousands of images in a relatively short time and such that model 571 is optimized using large sets of images. For example, modifying model 571 based on an average score calculated for a set of scores efficiently trains model 571 such that it is optimized for a set of images and not just for a single image.

In some embodiments training NN 570 may be terminated when determining at least one of: scores produced by the first function and scores produced by the second function has reached one of: a minimal value and a maximal value. For example, identifying that the values of the dis-similarity score (score-A) do not decrease over a number or set of consecutive iterations may indicate that additional iterations will not improve model 571 and accordingly, an embodiment may terminate a training of NN 570.

Some embodiments may terminate a training of NN 570 when determining a function of at least one of: scores produced by the first function and scores produced by the second function has reached one of: a minimal value and a maximal value. For example, a function such as a derivative may be applied to a set of values of score-A and, identifying that only a marginal change of values of score-A is achieved over a set of iterations, an embodiment may select to terminate the flow shown by FIG. 5 and provide model 571 as shown by block 580. Providing model 571 as shown by block 580 may include providing any digital object that enables a unit (e.g., unit 415 shown in FIG. 4) to operate based on model 571. For example, providing model 571 may include providing a copy of model 571.

While certain features of the invention have been illustrated and described herein, many modifications, substitutions, changes, and equivalents may occur to those skilled in the art. It is, therefore, to be understood that the appended claims are intended to cover all such modifications and changes as fall within the invention.

Various embodiments have been presented. Each of these embodiments may, of course, include features from other embodiments presented, and embodiments not specifically described may include various features described herein.

The invention claimed is:

1. A method of image de-identification, the method comprising:
   receiving an input image of a human face;
   iteratively modifying the input image to produce an output image of the human face by modifying style parameters while maintaining structure features of the input image until:
      a score indicating how unlikely a human is to associate the input image with the output image reaches a first threshold indicating that the human would not be able to associate the input image with the output image, and
      a score indicating an ability of a computerized unit to associate the input image with the output image reaches a second threshold indicating that the computerized unit would be able to associate the input image with the output image; and
   providing the output image,
   wherein modifying the input image is performed by a deep neural network, wherein the style parameters comprise high level features of the neural network, and wherein the neural network modifies the input image by modifying the high level features while maintaining the structure features,
   wherein modifying the style parameters while maintaining the structure features is carried out with application of a loss function $\mathcal{L}$:

$$\mathcal{L} = \lambda_0 \|\Theta_0(X_{src}) - \Theta_0(X_D)\| - \lambda_1 \|\Theta_1(X_{src}) - \Theta_1(X_D)\| \ldots - \lambda_k \|\Theta_k(X_{src}) - \Theta_k(X_D)\|$$

where k is a scale index, $\lambda$ is a weight, $\Theta$ is a parameter of the neural network, $X_{src}$ is the input image, $X_D$ is the output image, and $\Theta_k$ are the high level features.

2. The method of claim 1, comprising optimizing the de-identification by:
   calculating, in at least some of the iterations: (a) a first score value produced by a first function reflecting the likelihood that a human would associate the face in the input image with the face in the output image; and (b) a second score value produced by a second function reflecting the ability of a computerized unit to associate the face in the input image with the face in the output image; and
   providing the output image if a function of the first and second score values reaches a threshold.

3. The method of claim 2, comprising, providing the output image if a sequence of values produced by the function of the first and second score values converges to a value.

4. The method of claim 1, comprising, providing the modified image upon determining a threshold number of iterations was reached.

5. A method of generating a neural network (NN) model, the method comprising:
   training a NN including the model by, for each input image in a set of input images of faces:
      generating, using the model, an output image of the face;
      calculating, by a first function, a dis-similarity score reflecting the likelihood that a human would associate the face in the input image with the face in the output image;
      calculating, by a second function, an identity-similarity score reflecting an ability of a computerized unit to associate the face in the input image with the face in the output image; and
   modifying parameters of the model using a loss function designed to manipulate style features while maintaining structure features such that the dis-similarity score reaches a first threshold indicating that the human would not be able to associate the face in the input image with the face in the output image, and the identity-similarity score reaches a second threshold indicating that the computerized unit would be able to associate the face in the input image with the face in the output image, wherein the style features comprise high level features of the model, wherein modifying the style features while maintaining the structure features is carried out with application of a loss function $\mathcal{L}$:

$$\mathcal{L} = \lambda_0 \|\Theta_0(X_{src}) - \Theta_0(X_D)\| - \lambda_1 \|\Theta_1(X_{src}) - \Theta_1(X_D)\| \ldots - \lambda_k \|\Theta_k(X_{src}) - \Theta_k(X_D)\|$$

where k is a scale index, $\lambda$ is a weight, $\Theta$ is a parameter of the neural network, $X_{src}$ is the input image, $X_D$ is the output image, and $\Theta_k$ are the high level features.

6. The method of claim 5, comprising, modifying the parameters of the model such that a sequence of values produced by a function of the first and second scores converges to a value.

7. The method of claim 5, comprising, terminating the training when determining at least one of:
one or more scores produced by the first function reached a first threshold,
one or more scores produced by the second function reached a second threshold, and
a threshold number of processed images was reached.

8. The method of claim 5 comprising, modifying the parameters of the model based on an aggregated score of a set of input images.

9. The method of claim 5, comprising terminating the training when determining at least one of: scores produced by the first function and scores produced by the second function have reached one of: a minimal value and a maximal value.

10. The method of claim 5, comprising terminating the training when determining a function of at least one of: scores produced by the first function and scores produced by the second function has reached one of: a minimal value and a maximal value.

11. A system of image de-identification, the system comprising:
a memory; and
a processor configured to:
receive an input image of a human face;
iteratively modify the input image to produce an output image of the human face by modifying style parameters while maintaining structure features of the input image until:
a score indicating how unlikely a human is to associate the input image with the output image reaches a first threshold indicating that the human would not be able to associate the input image with the output image, and
a score indicating an ability of a computerized unit to associate the input image with the output image reaches a second threshold indicating that the computerized unit would be able to associate the input image with the output image; and
providing the output image,
wherein the processor is further configured to modify the input image by a deep neural network, wherein the style parameters comprise high level features of the neural network, and wherein the neural network modifies the input image by modifying the high level features while maintaining the structure features,
wherein modifying the style parameters while maintaining the structure features is carried out with application of a loss function $\mathcal{L}$:

$$\mathcal{L} = \lambda_0 \|\Theta_0(X_{src}) - \Theta_0(X_D)\| - \lambda_1 \|\Theta_1(X_{src}) - \Theta_1(X_D)\| \ldots - \lambda_k \|\Theta_k(X_{src}) - \Theta_k(X_D)\|$$

where k is a scale index, $\lambda$ is a weight, $\Theta$ is a parameter of the neural network, $X_{src}$ is the input image, $X_D$ is the output image, and $\Theta_k$ are the high level features.

12. The system of claim 11, wherein the processor is configured to optimize the de-identification by:
calculating, in at least some of the iterations: (a) a first score value produced by a first function reflecting the likelihood that a human would associate the face in the input image with the face in the output image; and (b) a second score value produced by a second function reflecting the ability of a computerized unit to associate the face in the input image with the face in the output image; and
providing the output image if a function of the first and second score values reaches a threshold.

13. The system of claim 12, wherein the processor is configured to provide the output image if a sequence of values produced by the function of the first and second score values converges to a value.

14. The system of claim 11, wherein the processor is configured to provide the modified image upon determining a threshold number of iterations was reached.

15. The method of claim 1, wherein the style parameters comprise high level features of a facial recognition model.

16. The method of claim 1, wherein iteratively modifying comprises using the output image of a first iteration is as the input image to a subsequent iteration.

17. The method of claim 5, wherein the style parameters comprise high level features of the NN.

18. The system of claim 11, wherein the processor is configured to modify the input image by a deep neural network, wherein the style parameters comprise high level features of the neural network, and wherein the neural network modifies the input image by modifying the high level features while maintaining the structure features.

* * * * *